United States Patent
Qian et al.

(10) Patent No.: US 9,946,704 B2
(45) Date of Patent: Apr. 17, 2018

(54) TONE MARK BASED TEXT SUGGESTIONS FOR CHINESE OR JAPANESE CHARACTERS OR WORDS

(71) Applicant: LENOVO (Singapore) PTE, LTD., New Tech Park (SG)

(72) Inventors: Ming Qian, Cary, NC (US); Jian Li, Chapel Hill, NC (US); Song Wang, Cary, NC (US); Jianbang Zhang, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 13 days.

(21) Appl. No.: 14/335,727

(22) Filed: Jul. 18, 2014

(65) Prior Publication Data
US 2016/0019201 A1    Jan. 21, 2016

(51) Int. Cl.
*G06F 17/27* (2006.01)
*G06F 17/28* (2006.01)
*G06F 3/01* (2006.01)
*G06F 3/0488* (2013.01)
*G06F 3/16* (2006.01)
*G06F 3/023* (2006.01)
(Continued)

(52) U.S. Cl.
CPC ............ *G06F 17/273* (2013.01); *G06F 3/018* (2013.01); *G06F 3/0237* (2013.01); *G06F 3/04883* (2013.01); *G06F 3/167* (2013.01); *G06F 17/2223* (2013.01); *G06F 17/242* (2013.01); *G06F 17/276* (2013.01); *G06F 17/2863* (2013.01)

(58) Field of Classification Search
None
See application file for complete search history.

(56) References Cited

U.S. PATENT DOCUMENTS

| 5,680,510 A | 10/1997 | Hon et al. |
| 6,636,163 B1 * | 10/2003 | Hsieh ................ G06F 3/0233 341/28 |

(Continued)

FOREIGN PATENT DOCUMENTS

| JP | 06175576 A | * | 6/1994 |
| JP | 06175576 A | * | 6/1994 |

OTHER PUBLICATIONS

U.S. Appl. No. 14/160,011, Office Action Summary, dated Aug. 26, 2015.

(Continued)

*Primary Examiner* — Richa Mishra
(74) *Attorney, Agent, or Firm* — Kunzler, PC

(57) ABSTRACT

For suggesting input text based on tone mark information for Chinese or Japanese characters or words, an apparatus, system, method, and computer program product are disclosed. The apparatus may include a processor, a handwriting input unit operatively coupled to the processor, an input text module that receives input text comprising at least one character, a tone mark module that identifies a tone mark associated with the input text, and a suggestion module that proposes at least one next character based on the identified tone mark. The input text module may receive a user selection of the at least one next character. The input text may include characters selected from the group consisting of: Chinese characters and Japanese characters.

19 Claims, 7 Drawing Sheets

(51) Int. Cl.
G06F 17/22 (2006.01)
G06F 17/24 (2006.01)

(56) References Cited

U.S. PATENT DOCUMENTS

| | | | |
|---|---|---|---|
| 2001/0044724 A1* | 11/2001 | Hon | G06F 17/2715 704/260 |
| 2004/0025115 A1 | 2/2004 | Sienel et al. | |
| 2006/0047386 A1 | 3/2006 | Kanevsky et al. | |
| 2008/0056578 A1 | 3/2008 | Shilman et al. | |
| 2008/0270118 A1* | 10/2008 | Kuo | G06F 17/273 704/9 |
| 2009/0327948 A1 | 12/2009 | Penttinen et al. | |
| 2012/0089632 A1* | 4/2012 | Zhou | G06F 3/0237 707/769 |
| 2012/0265527 A1 | 10/2012 | Xiong et al. | |
| 2014/0244234 A1* | 8/2014 | Huang | G06F 17/2818 704/2 |
| 2014/0354549 A1* | 12/2014 | Huang | G06F 3/04886 345/168 |
| 2015/0088486 A1* | 3/2015 | Barrett | G06F 17/289 704/3 |

OTHER PUBLICATIONS

U.S. Appl. No. 14/160,011, Office Action Summary, dated Feb. 9, 2016.
U.S. Appl. No. 14/160,011, Office Action Summary, dated Jun. 24, 2016.

* cited by examiner

TONE MARK BASED TEXT SUGGESTIONS FOR CHINESE OR JAPANESE CHARACTERS OR WORDS

BACKGROUND

Field

The subject matter disclosed herein relates to text input and more particularly relates to suggesting input text based on tone mark information for Chinese or Japanese characters or words.

Description of the Related Art

Touchscreen devices are popular and widely sold. Smartphones, tablet computers, and other touchscreen devices often lack a physical keyboard for textual input. As such, handwriting recognition software is gaining popularity as a way to input text into a touchscreen device. However, popular input tools for Chinese and Japanese do not support tone mark input.

Tonal languages, for example Mandarin Chinese, use tones to distinguish between different words having the same pronunciation. Tone marks may be used to indicate the tone when writing in these languages. Additionally, when using a keyboard (either physical or on-screen) a user cannot easily indicate a tone associated with the Pinyin word.

BRIEF SUMMARY

An apparatus for suggesting input text based on tone mark information for Chinese or Japanese characters or words is disclosed. A method and computer program product also perform the functions of the apparatus.

The apparatus may include a processor, a handwriting input unit operatively coupled to the processor, an input text module that receives input text comprising at least one character, a tone mark module that identifies a tone mark associated with the input text, and a suggestion module that proposes at least one next character based on the identified tone mark. The input text module may receive a user selection of the at least one next character. The input text may include characters selected from the group consisting of: Chinese characters and Japanese characters.

In some embodiments, the apparatus also includes a correction module that determines a probable tone mark for the input text based on nearby characters and compares the probable tone mark to the identified tone mark, wherein the suggestion module proposes a correction to the identified tone mark in response to the identified tone mark not matching the probable tone mark. In some embodiments, the apparatus also includes a homonym module that identifies a list of homonyms based on the input text and the identified tone mark, wherein the suggestion module proposes at least one homonym from the list of homonyms.

In some embodiments, the apparatus also includes a tone library module that stores tone mark information in a tone library, the tone mark information based on the identified tone mark and an audio module that creates an audio representation of input words based on the tone library. The tone library module may display tone marks on the input text based on the tone library and display the input text without the tone mark in response to the user selecting a next character.

In some embodiments, the apparatus also includes a marking module that displays the identified tone mark in proximity to the input text, determines whether a sentence has been completed, and removes the tone mark from the input text in response to the sentence being completed. In some embodiments, the apparatus also includes a pronunciation module that prompts a user to enable a pronunciation guide and displays a tone mark in proximity to characters of the input text in response to the user enabling the pronunciation guide.

The method may include receiving, by use of a processor, input text, identifying a tone mark associated with the input text, and suggesting a next character based on the tone mark. The method may also include receiving a user selection of the next character. The input text may include Chinese characters, Pinyin words, Japanese characters, and/or Romaji words.

In some embodiments, the method also includes determining a probable tone mark for the input text based on nearby characters, comparing the probable tone mark to the identified tone mark, and suggesting a correction to the identified tone mark in response to the identified tone mark not matching the probable tone mark. In some embodiments, the method also includes presenting a list of homonyms based on the identified tone mark, and receiving a user selection of a homonym from the list of homonyms.

In some embodiments, the method also includes storing tone mark information in a tone library, the tone mark information based on the identified tone mark. In some embodiments, the method also includes displaying tone marks on the input text based on the tone library, and displaying the input text without the tone mark in response to the user selecting a next character. In some embodiments, the method also includes creating an audio representation of input words based on the tone library.

In some embodiments, the method also includes prompting a user to enable a pronunciation guide, and displaying a tone mark in proximity to characters of the input text in response to the user enabling the pronunciation guide. In some embodiments, the method also includes displaying the identified tone mark in proximity to the input text, determining whether a sentence has been completed, and removing the tone mark from the input text in response to the sentence being completed.

The computer program product may include a computer readable storage medium that stores code executable by a processor to perform: receiving input text, identifying a tone mark associated with the input text, and suggesting a next character based on the tone mark. In some embodiments, the computer program product also includes presenting a list of homonyms based on the identified tone mark, and receiving a user selection of a homonym from the list of homonyms.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
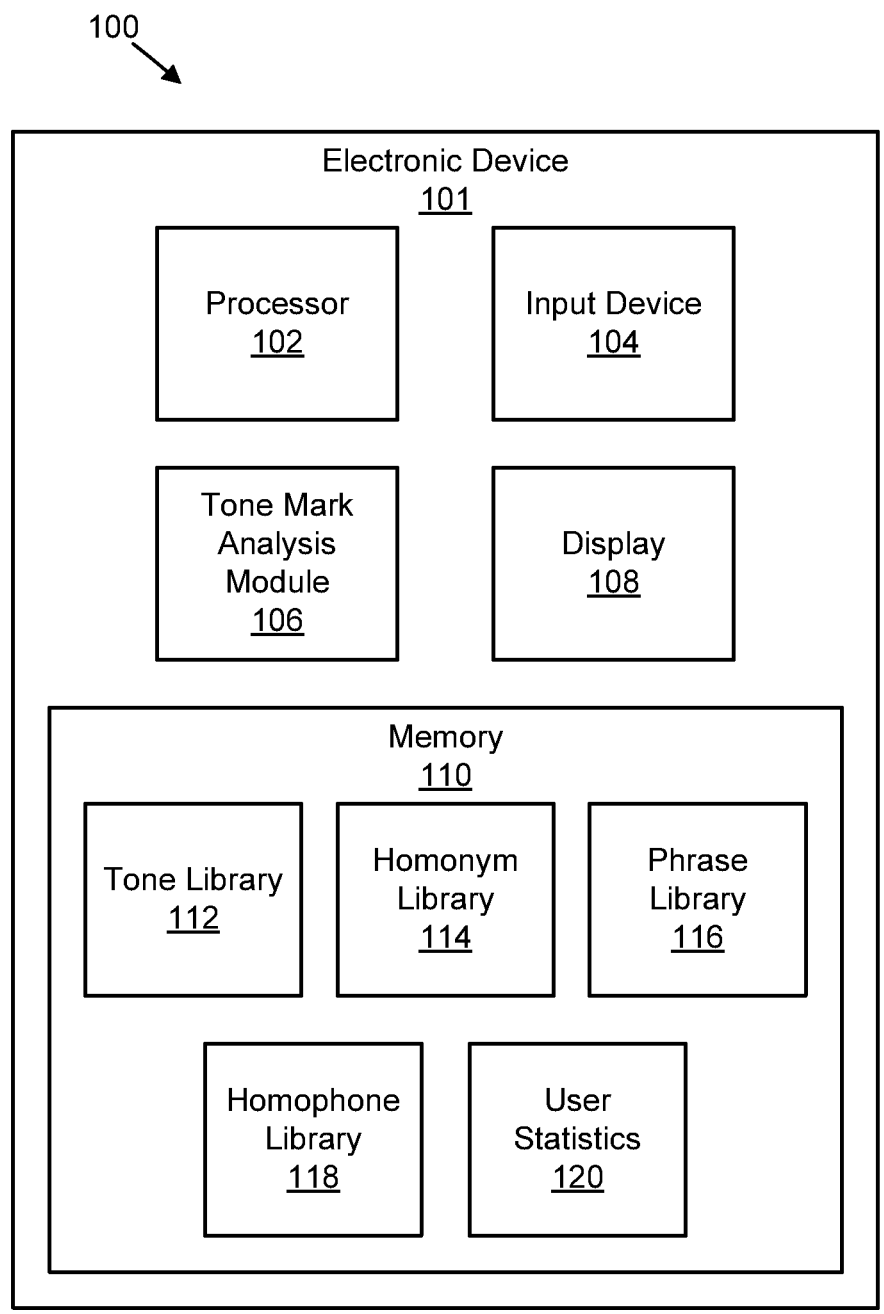
FIG. 1 is a schematic block diagram illustrating one embodiment of a system for suggesting input text based on tone mark information for Chinese or Japanese characters or words.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products receive text input, identify at least one word or character from the text input, receive and identify a tone mark associated with the text input, and provide at least one phrase hint based on the tone mark, thereby providing a more natural way to input Chinese, Japanese, or other tonal languages while increasing input speed and throughput. Adjacent words or characters may be analyzed to determine the at least one phrase hint. Corrections to the tone mark may be suggested if the identified tone mark does not match a likely tone mark based on the adjacent words or characters.

In some embodiments, the systems, apparatuses, methods, and/or computer program products include a pronunciation guide that displays tone marks in proximity to the input text so as to aid a user learning the language of the input text. The systems, apparatuses, methods, and/or computer program products may create a tone library based on the received tone mark and used to display the tone marks and may create an audio representation of input words based on the tone library.

FIG. 1 depicts a system 100 for suggesting input text based on tone mark information for Chinese or Japanese characters or words, according to embodiments of the disclosure. The system 100 includes an electronic device 101. The electronic device 101 comprises a processor 102, an input device 104, a tone mark analysis module 106, and a memory 110. In some embodiments, the electronic device 101 also includes display 108. The components of the electronic device 101 may be communicatively coupled to each other, for example via a computer bus.

The processor 102, in one embodiment, may comprise any known controller capable of executing computer-readable instructions and/or capable of performing logical operations on the input text. For example, the processor 102 may be a microcontroller, a microprocessor, a central processing unit (CPU), a graphics processing unit (GPU), an auxiliary processing unit, a FPGA, or similar programmable controller. In some embodiments, the processor 102 executes instructions stored in the memory 110 to perform the methods and routines described herein. The processor 102 is communicatively coupled to the input device 104, the tone mark analysis module 106, the display 108, and the memory 110.

The input device 104, in one embodiment, may comprise any known computer input device including a touch panel, a button, a keyboard, or the like. For example, the input device 104 may be a handwriting input unit operatively coupled to the processor 102. In some embodiments, the input device 104 may be integrated with the display 108, for example, as a touchscreen or similar touch-sensitive display. In some embodiments, the input device 104 comprises a touchscreen and text may be input by using a virtual keyboard displayed on the touchscreen and/or by handwriting on the touchscreen. In some embodiments, the input device 104 comprises two or more different devices. The tone mark may be input using the same input device as the text, or using a separate input device. For example, text may be typed with a keyboard and tone marks may be input using a digitizer or touch panel.

The tone mark analysis module 106, in one embodiment, receives an input text and/or a tone mark from the input device 104 and provides a hint suggesting subsequent characters, words, or phrases based on the tone mark, thereby increasing input speed and throughput. The tone mark analysis module 106 may be comprised of computer hardware, computer software, or a combination of both computer hardware and computer software. For example, the tone mark analysis module 106 may comprises circuitry, or a processor, configured to interpret the input text. As another example, the tone mark analysis module 106 may comprise computer program code that allows the processor 102 to interpret the input text.

In some embodiments, the tone mark analysis module 106 associates a tone mark with the input text. In certain embodiments, the tone mark analysis module 106 determines a likely tone mark for the input text based on nearby characters and provides a hint correcting the identified tone mark if the likely tone mark does not match the identified tone mark. In certain embodiments, the tone mark analysis module 106 presents a list of homonyms based on the identified tone mark and receives a user selection of a homonym from the list of homonyms. The tone mark analysis module 106 may prompt a user to enable a pronunciation guide and display a tone mark in proximity to characters of the input text in response to the user enabling the pronunciation guide. In some embodiments, the tone mark analysis module 106 stores tone mark information in a tone library, the tone mark information based on the identified tone mark. The tone mark analysis module 106 may also create an audio representation of input words based on the tone library. The tone mark analysis module 106 is discussed in further detail with reference to FIG. 2, below.

The display 108, in one embodiment, may comprise any known electronic display capable of outputting visual data to a user. For example, the display 108 may be an LCD display, an LED display, an OLED display, a projector, or similar display device capable of outputting images, text, or the like to a user. In some embodiments, the display 108 may be integrated with the input device 104, for example, as a touchscreen or similar touch-sensitive display. The display 108 may receive image data for display from the processor 102 and/or the tone mark analysis module 106.

The memory 110, in one embodiment, is a computer readable storage medium. In some embodiments, the memory 110 includes volatile computer storage media. For example, the memory 110 may include a random access memory (RAM), including dynamic RAM (DRAM), synchronous dynamic RAM (SDRAM), and/or static RAM (SRAM). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

The memory 110 stores a tone library 112 and a homonym library 114. The tone library 112 includes tone mark information associated with input text. Each entry in the tone library 112 may include a tone mark identity (for example, a specific one of the five possible tone in Mandarin Chinese) and a word or character associated with the tone mark. In some embodiments, each word or character identified in the input text has its own entry in the tone library 112, the library being indexed by word (or character) order. In other embodiments, each tone mark identified has its own entry in the tone library 112, the library being indexed by tone mark order.

In certain embodiments, each entry in the tone library 112 may include a probability that the input tone mark is correct. For example, a user who is learning Japanese may input an incorrect tone mark with Japanese input text. As another example, a native Chinese speaker may accidentally input an incorrect tone mark with Mandarin Chinese input text. The tone mark analysis module 106 may determine a probability that the input tone mark is correct and store the probability in the tone library 112. The tone mark analysis module 106 may later use the stored probability to suggest a tone mark correction.

The homonym library 114 includes a plurality of homonym sets. Each homonym set includes a plurality of homonyms for the same word or character. Each homonym set is searchable by tone mark. As used herein "homonym" refers to one of a plurality of characters having the same spelling or shape, but having a different meaning. For example, in Mandarin Chinese the character "的" can have different meanings based on both the tone and on nearby characters (i.e., the context). If used with the first tone, this character can mean "taxi" (e.g., "打的"), while the same character can mean "indeed" when used with the second tone (e.g., "的确") or "bull's-eye" or "objective" when used with the fourth tone (e.g., "目的").

The homonym library 114 allows the tone mark analysis module 106 to narrow down a list of possible phrases that include the identified character based on the tone mark, thereby increasing input speed and throughput. The homonym library 114 may also allow the tone mark analysis module 106 to determine whether an incorrect tone mark is input by checking for homonyms having the input tone mark.

In response to receiving input text, the tone mark analysis module 106 may identify at least one character or word in the input text. The tone mark analysis module 106 may then search the homonym library 114 to select a homonym set that matches the identified character or word. In response to identifying a tone mark associated with the input text, the tone mark analysis module 106 may search the selected homonym set using the identified tone mark and suggest a next character or phrase based on homonyms of the identified character or word that use the identified tone mark.

The phrase library 116 includes a plurality of phrases. The phrase library 116 include valid phrases and may be searchable based on a character or word of input text. The tone mark analysis module 106 may use the phrase library 116 to determine a likely next character, word, or phrase. For example, the phrase library 116 may be used to calculate a likelihood that a character or word of input text belongs to a particular phrase. In some embodiments, the phrase library 116 may also include language statistics, such as commonly used phrases.

The homophone library 118 includes a plurality of homophone sets. Each homophone set includes a plurality of homophones for the same word or character. Each homophone set is searchable by tone mark. As used herein "homophone" refers to one of a plurality of characters having the same pronunciation, but corresponding to different characters. For example, in Mandarin Chinese the Pinyin word "ma" can correspond to several different characters based on the tone. If used with the first tone, "ma" can correspond to "妈," "蚂," or "抹" while the same Pinyin word can correspond to "麻" or "蟇" when used with the second tone, or "马" when used with the third tone. In some embodiments, a plurality of homophones may exist for the same tone, as discussed below with reference to FIG. 4A.

The homophone library 118 allows the tone mark analysis module 106 to determine at least one character corresponding to a Pinyin or Romaji word by searching the homophone library 118 based on the input word and the input tone mark. The homophone library 118 may also allow the tone mark analysis module 106 to narrow down a list of possible phrases that include the input word based on the tone mark, thereby increasing input speed and throughput.

In response to receiving input text, the tone mark analysis module 106 may identify at least one character or word in the input text. The tone mark analysis module 106 may then search the homophone library 118 to select a homophone set that matches the identified character or word. In response to identifying a tone mark associated with the input text, the tone mark analysis module 106 may search the selected homophone set using the identified tone mark and suggest a next character or phrase based on homophones of the identified character or word that use the identified tone mark.

The user statistics 120 include data relating to characters, words, and/or phrases employed by the user. For example, the user statistics 120 may include lists of recently used characters, words, and/or phrases as well as lists of commonly (i.e., frequently) used characters, words, and/or phrases. The tone mark analysis module 106 may modify the user statistics based on the input text and/or on selected next characters, words, and phrases.

In certain embodiments, the memory 110 also stores program code and/or data for one or more applications actively running on the electronic device 101. In some embodiments, the memory 110 also stores an operating system operating on the electronic device 101.

Figure 2:
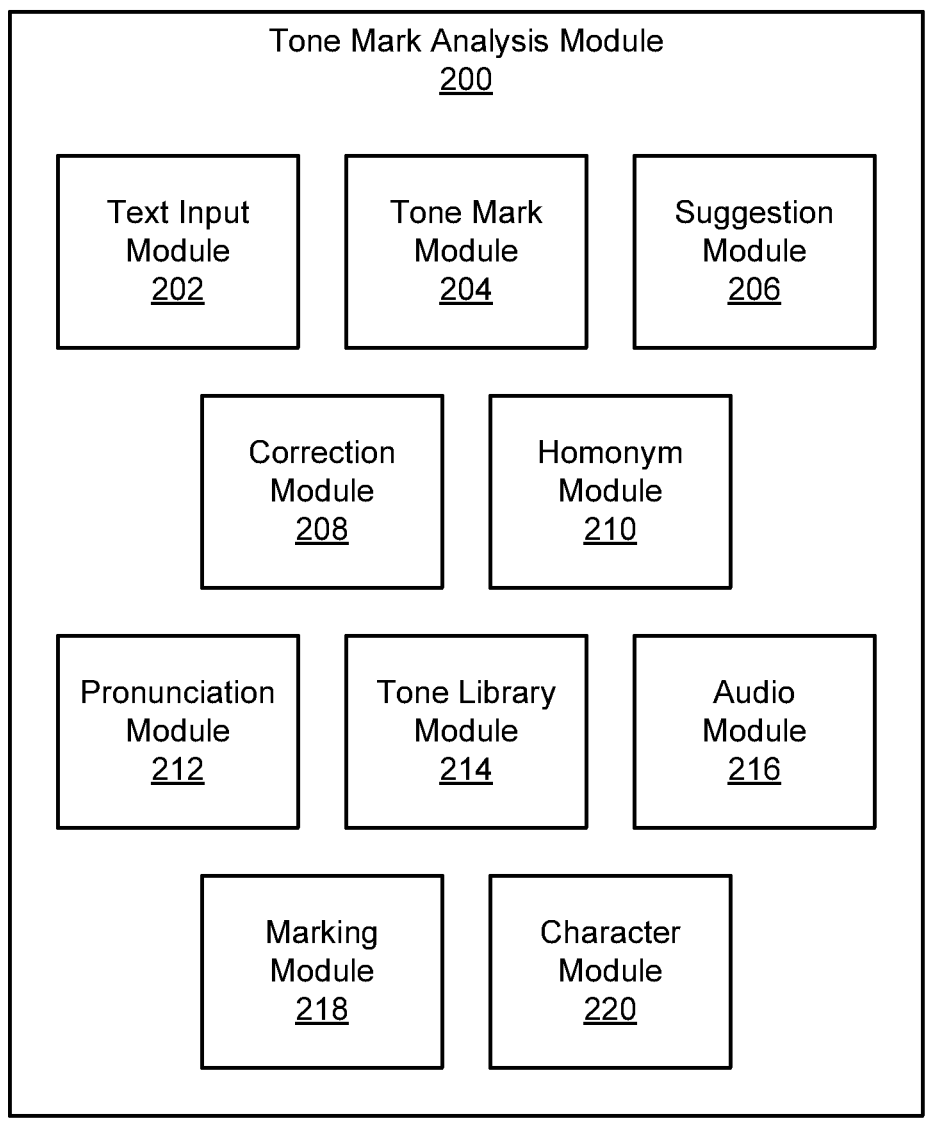
FIG. 2 is a schematic block diagram illustrating one embodiment of an apparatus for suggesting input text based on tone mark information for Chinese or Japanese characters or words.

FIG. 2 depicts an apparatus 200 for suggesting input text based on tone mark information for Chinese or Japanese characters or words, according to embodiments of the disclosure. In some embodiments, the apparatus 200 may be similar to, and perform the same functions as, the tone mark analysis module 106 described above with reference to FIG. 1. In general, as described above, the tone mark analysis module 200 associates a tone mark with input text and suggests subsequent characters, words, or phrases based on the tone mark. The tone mark analysis module 200 includes a text input module 202, a tone mark module 204, and a language identification module 206. In some embodiments, the tone mark analysis module 200 also includes one or more of a correction module 208, a homonym module 210, a pronunciation module 212, a tone library module 214, an audio module 216, and/or a marking module 218. The modules of the tone mark analysis module 200 may be communicatively coupled to one another.

The text input module 202, in one embodiment, is configured to receive input text from an input device, such as input device 104. The input text may include handwritten text and/or typed text. In certain embodiments, the text input module 202 receives input directly from the input device(s) 104. In certain embodiments, the text input module 202 receives the input text from a processor, such as processor 102.

In some embodiments, the input text includes Romanized words corresponding to Chinese or Japanese characters. For example, the input text may include at least one Pinyin (Chinese) word or at least one Romaji (Japanese) word. In certain embodiments, the input text includes one or more Asian characters, such as Chinese Hanzi characters or Japanese Kanji characters. The Asian characters include traditional and/or simplified characters. As used herein "character" refers to a logogram that represents a single word or syllable, rather than an alphabetical "letter."

In some embodiments, the text input module 202 may also determine a particular character or word from the input text. For example, the text input module 202 may perform a text recognition analysis of the input text to identify particular characters or words from the input text. In certain embodiments, the text input module 202 identifies strokes used to input the handwriting and translates the strokes into print text. In some embodiments, the text input module 202 displays the print characters or words corresponding to handwritten input text. In some embodiments, the text input module 202 may search a homophone library, such as the homophone library 118, to identify at least one homophone that matches the identified character or word.

In some embodiments, the text input module 202 identifies a particular language associated with the input text. For example, the text input module 202 may distinguish between languages using the same alphabet, such as English and Pinyin. As another example, the text input module 202 may distinguish between languages using Chinese characters, such as Mandarin Chinese and Japanese.

In some embodiments, the text input module 202 identifies input for which text recognition and/or tone mark analysis should be performed. In certain embodiments, the text input module 202 only passes along text that is input into specific fields in, e.g., a graphical user interface (GUI) or webpage. For example, the text input module 202 may recognize and filter out web addresses or uniform resource locators (URLs) entered into an internet browser while passing along other text input into the internet browser. In certain embodiments, the text input module 202 only passes on text if certain processes, applications, and/or windows are running and/or active. For example, the text input module 202 may pass on text input into text messaging application and filter out text input into a command line application.

In some embodiments, the text input module 202 is further configured to receive a user selection of at least one next character. For example, the suggestion module 206 may propose one or more next characters to the user and the text input module 202 may receive a user selection as if the user had manually input the selected word or character.

The tone mark module 204, in one embodiment, is configured to identify a tone mark associated with the input text. In certain embodiments, the tone mark is handwritten. For example, the tone mark may be input using a digital pen, a touch panel, a digitizer panel, or the like. The tone mark may include a diacritic mark, a glyph or symbol added to a word or letter, a symbol added to an end of the word, a multi-touch gesture associated with the word, or the like. The tone mark module 204 receives the tone mark from an input device, such as the input device 104, and/or from a processor, such as the processor 102.

In some embodiments, the tone mark module 204 may identify an input tone mark as a particular tone mark among the tone marks of the input language. For example, in Mandarin Chinese there are four tones (plus a neutral tone) used to distinguish homophones characters or words (i.e., characters or words with the same sound). As another example, in Japanese there are typically two tones (also known as pitch accents) used to distinguish words. The tone mark module 204 may identify the tone marks to determine the particular tone associated with the character or word.

In some embodiments, the tone mark module 204 determines if a received tone mark should be associated with received text. For example, the tone mark module 204 may compare timestamps, positions, or other attributes to determine whether the received tone mark should be associated with a particular input text. The text input module 202 may also determine a particular character from the input text associated with the tone mark.

The tone mark module 204 may examine each word of the input text for tone marks. For example, where the input text includes a plurality of characters or words, the tone mark module 204 may examine each word of the phrase. In some embodiments, the tone mark module 204 parses the input text to identify words. In other embodiments, the tone mark module 204 receives parsed input text from another module, such as the text input module 202.

In certain embodiments, the tone mark module 204 provides information regarding the identified tone mark to another module or device, such as another module in the tone mark analysis module 200. For example, the tone mark module 204 may pass along the identity of the received tone mark to the suggestion module 206 or to the pronunciation module 212.

In some embodiments, the tone mark module 204 is further configured to identify a tone mark corresponding to a user selection of at least one next character. For example, the suggestion module 206 may propose one or more next characters to the user and the tone mark module 204 may identify a tone mark from a user selection as if the user had manually input the tone mark corresponding to the selected word or character.

The suggestion module 206, in one embodiment, proposes at least one character, word, and/or phrase based on the identified tone mark. The suggestion module 206 may provide hints as to a next character or phrase, a character corresponding to an input word, or the like. In some embodiments, the suggestion module 206 may identify a list of likely next characters or words based on the input text and use the identified tone mark to refine (i.e., filter) the list. The suggestion module 206 may then propose a predetermined number of next characters or words from the identified list. The suggestion module 206 may propose at least one likely next character, word, and/or phrase based on user statistics including recently used characters, words, and/or phrases and commonly used characters, words, and/or phrases. The suggestion module 206 may propose a single most likely character, word, or phrase, or it may provide a predetermined number of most probable characters, words, or phrases (e.g., the top two most likely characters, words, or phrases).

In some embodiments, the suggestion module 206 determines one or more likely phrases that include the input text and selects one or more likely phrases based on the identified tone mark. The suggestion module 206 may retrieve information from a phrase library, such as the phrase library 116, to determine the one or more likely phrases. In certain embodiments, the suggestion module 206 proposes the entire selected phrase. In other embodiments, the suggestion module 206 proposes a likely next word based on the selected phrase.

In some embodiments, the suggestion module 206 calculates a probability that a particular character, word, or phrase will follow the input text. The probability may be based on how often the particular character, word, or phrase occurs in conjunction with the input text and/or adjacent characters or words. In some embodiments, the probability is based on language statistics stored in memory. In certain embodiments, the language statistics are adjusted based on user statistics, such as the user statistics 120. In some embodiments, the suggestion module 206 may propose only characters, words, or phrases whose probability is above a predefined threshold.

In some embodiments, the suggestion module 206 may propose a correction to the identified tone mark. For example, a user learning Mandarin Chinese may incorrectly input a tone mark. In response to the incorrect tone mark, the suggestion module 206 may propose a probable tone mark based on the input text. In some embodiments, the suggestion module 206 determines the probable tone mark. In other embodiments, the suggestion module 206 receives the probable tone mark from the correction module 208.

In some embodiments, the suggestion module 206 may propose one or more homonyms based on the input text. For example, a particular character or word of the input text may have one or more homonyms and the suggestion module 206 may identify a particular homonym based on a tone mark associated with the input text. In some embodiments, the suggestion module 206 determines the list of homonyms. In other embodiments, the suggestion module 206 receives the list of homonyms from the homonym module 210. The suggestion module 206 may propose a next character based on the list of homonyms or may identify and propose likely phrases based on the list of homonyms.

In certain embodiments, the suggestion module 206 may receive a user selection of a proposed next character, word, and/or phrase. In some embodiments, the suggestion module 206 may store user statistics based on the selected next character, word, and/or phrase including recently used characters, words, and/or phrases and commonly used characters, words, and/or phrases.

In some embodiments, if there is no tone mark associated with the input text, then the suggestion module 206 provides no suggestions. In other embodiments, the suggestion module 206 proposes a most likely tone mark if there is no tone mark associated with the input text. If the user selects the proposed tone mark, the suggestion module 206 may then propose a next character, word, or phrase based on the selected tone mark.

The correction module 208, in one embodiment, is configured to determine a probable tone mark for the input text. The correction module 208 may determine a probable tone mark based on the input text and/or on nearby characters. The correction module 208 may also determine a probable tone mark based on a tone library, such as the tone library 112. The correction module 208 may be a component of the suggestion module 206 or the correction module 208 may cooperate with the suggestion module 206 to identify and suggest a probable tone mark.

The correction module 208 then compares the probable tone mark to the identified tone mark. In certain embodiments, the correction module 208 suggests the probable tone mark, responsive to the probable tone mark differing from the identified tone mark. In other embodiments, the correction module 208 provides the probable tone mark to the suggestion module 206, responsive to the probable tone mark. For example, the correction module 208 may cause the suggestion module 206 to propose a correction to the identified tone mark (based on a probable tone mark) in lieu of a next character, word, or phrase.

In some embodiments, the correction module 208 may determine more than one probable tone mark based on the input text and/or on adjacent characters or words. If none of the probable tone marks match the input tone mark, then the correction module 208 may suggest a correction to the input tone mark based on a most probable tone mark. The correction module 208 may propose or provide the single most likely tone mark or may provide a predetermined number of most probable tone marks (e.g., the top two most likely tone marks).

In some embodiments, the correction module 208 calculates a probability that the input tone mark is correct. The probability may be based on how often the identified tone mark occurs in conjunction with the input text and/or adjacent characters or words. For example if the word or character associated with the input tone mark does not typically follow the word (one or two) immediately prior to the associated word, then the input tone mark may be assigned a low probability of being correct. In some embodiments, the probability is based on language statistics stored in memory. In certain embodiments, the language statistics are adjusted based on user statistics, such as the user statistics 120. In some embodiments, the correction module 208 may suggest a correction to the identified tone mark when its probability is below a predefined threshold.

The homonym module 210, in one embodiment, is configured to identify a list of homonyms based on the input text and the identified tone mark. In some embodiments, the homonym module 210 may pass the identified homonyms to the suggestion module 206 and the suggestion module 206 may propose a next character based on the list of homonyms. In other embodiments, the suggestion module 206 may identify likely phrases based on the list of homonyms. The homonym module 210 may be a component of the suggestion module 206 or the homonym module 210 may cooperate with the suggestion module 206 to identify and suggest a next character, word, or phrase.

The homonym module 210 may search a homonym library, such as the homonym library 114, to select a homonym set that matches the identified character or word of the input text. In response to identifying a tone mark associated with the input text, the homonym module 210 may search the selected homonym set using the identified tone mark. Accordingly, the tone mark provides additional information that can be used to narrow the list of possible next characters. Further, the tone mark can be used to select only phrases that include those homonyms associated with the tone mark. Thus, the tone mark information allows for increased input speed and throughput.

The pronunciation module 212, in one embodiment, is configured to prompt a user to enable a pronunciation guide and to display a tone mark in proximity to characters of the input text in response to the user enabling the pronunciation guide. In some embodiments, the pronunciation module 212 shows tone marks for all displayed characters or words that have been inputted. In some embodiments, the pronunciation module 212 references a tone library, such as the tone library 112, to identify a tone mark corresponding to each displayed character (or word) of the input text.

The pronunciation module 212 may display the tone mark at a location adjacent to the character or word. For example, in Mandarin Chinese, tone marks are typically located above the word (Pinyin) or character (Hanzi). As another example, in Japanese the tone marks (i.e., pitch accents) may be displayed above the word (or character) to indicate a high tone (pitch) and below the word (or Kanji) to indicate a low tone (pitch). As yet another example, a Japanese word (or Kanji) may display a tone mark above the word (or Kanji) when the pronunciation guide is enabled, the tone mark indicating one of a high tone and a low tone.

The tone library module 214, in one embodiment, is configured to store tone mark information in a tone library, the tone mark information based on the identified tone mark. The tone mark information may include a tone mark identity (for example, a specific one of the five possible tone in Mandarin Chinese) and a word (or character) associated with the tone mark. In certain embodiments, the tone mark information also includes a likelihood that the input tone mark is correct. The tone library module 214 may obtain tone mark information whenever a tone mark is identified by the tone mark module 204 and store it in the tone library, such as the tone library 112. The tone library module 214 may also be configured to retrieve tone mark information from the library and provide it to another module of the tone mark analysis module 200, for example the audio module 216 or marking module 218.

The audio module 216, in one embodiment, is configured to create an audio representation of input words and/or characters based on the tone library. In some embodiments, the audio module 216 used a computer synthesized voice to create the audio representation. In other embodiments, the audio module 216 uses pre-recorded voice samples to create the audio representation. The audio module 216 may use the tone mark information stored in the tone library to synthesize and/or select appropriate tone for the input words and/or characters. For example, the audio module 216 may use identified tone from the tone library to create the audio representation.

The marking module 218, in one embodiment, is configured to display at least one identified tone mark in proximity to the input text. The marking module 218 may display the tone mark(s) on the input text based on the tone library. In some embodiments, the marking module 218 displays the identified tone mark until a next character is selected or input. In certain embodiments, the marking module 218 may display the tone marks whenever a pronunciation guide is enabled.

In some embodiments, the marking module 218 is further configured to determine whether a sentence or phrase has been completed and to remove the tone mark(s) from the input text in response to the sentence or phrase being completed. The marking module 218 may display the tone mark at a location adjacent to the character or word. For example, in Mandarin Chinese, tone marks are typically located above the word (Pinyin) or character (Hanzi). As another example, in Japanese the tone marks (i.e., pitch accents) may be displayed above the word (or character) to indicate a high tone (pitch) and below the word (or Kanji) to indicate a low tone (pitch).

The character module 220, in one embodiment, is configured to identify a character (e.g., a Hanzi or Kanji character) corresponding to a word (e.g., a Pinyin or Romaji word) of the input text. The character module 220 is further configured to recognize a tone mark associated with the input word, for example after receiving the tone mark from the tone mark module 204. In some embodiments, the character module 220 converts (i.e., translates) the input word into the corresponding character. For example, the character module 220 may recognize a written Pinyin word and identify a plurality of characters corresponding to the Pinyin word. The character module 220 may then use the tone mark to select at least one corresponding character based on the tone mark. The character module 220 may be further configured to display the identified character.

In some embodiments, the character module 220 and/or the suggestion module 206 propose the selected character(s) to the user. Accordingly, the tone mark provides additional information that can be used to narrow the list of possible characters. Further, the tone mark can be used to quickly identify phrases that include the input word associated with the tone mark. Thus, the tone mark information allows for increased input speed and throughput. In some embodiments, the character module 220 may pass the identified homophones to the suggestion module 206 to propose a text character based on the identified homophones. In other embodiments, the suggestion module 206 may identify likely next characters or phrases based on the identified homophones.

In some embodiments, there are several homophones corresponding to the input word and the character module 220 identifies at least one homophone based on the input text and/or the identified tone mark. In certain embodiments, the character module 220 searches a homophone library, such as the homophone library 118, to identify at least one homophone that matches the input word. In response to identifying a tone mark associated with the input word, the character module 220 may filter the identified homophones using the identified tone mark.

For example, after receiving a Pinyin input word (e.g., via the text module 202) and identifying a tone mark associated with the Pinyin word (e.g., via the tone mark module 204), the character module 220 identifies at least one Hanzi character associated with the Pinyin word (i.e., the pronunciation) and the tone mark. The suggestion module 206 may then present the at least one Hanzi character as a next character and/or may present a phrase including the identified Hanzi character(s) as a likely next phrase. Beneficially, using tone marks significantly reduces the number of possible characters and/or phrases, thus improving input speed and throughput.

In some embodiments, the character module 220 is a component of the text input module 202 and/or suggestion module 206. In other embodiments, the character module 220 operates independently and cooperates with the text input module 202 and suggestion module 206 to identify and suggest a text character corresponding to an input word.

FIGS. 3A-3D depict an apparatus 300 for suggesting input text based on tone mark information for Chinese or Japanese characters or words, according to embodiments of the disclosure. The text suggestion apparatus 300 may be similar to the tone mark analysis module 106 and/or the tone mark analysis module 200 described above with reference to FIGS. 1-2. The text suggestion apparatus 300 displays a graphical user interface (GUI) divided into an input region 302 for handwriting and a received text region 304. When a user inputs text and tone marks, the text suggestion apparatus 300 displays the handwriting input in the region 302. Subsequently, the text suggestion apparatus 300 identifies the input character and tone mark and displays a text representation in the received text region 304. Additionally, the text suggestion apparatus 300 proposes a first phrase 306 and a second phrase 308 based on the input character and the tone mark. In some embodiments, the text suggestion apparatus 300 displays a plurality of controls 310 for controlling the input method and/or enabling a pronunciation guide.

Figure 3A:
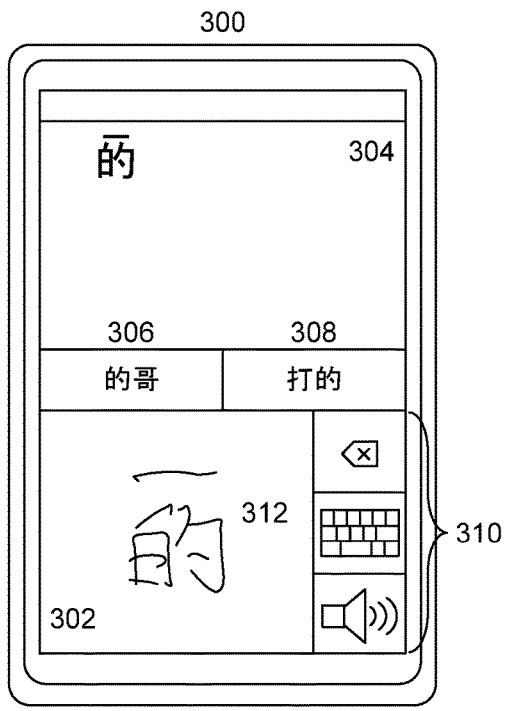
FIG. 3A is a diagram illustrating one embodiment of an apparatus for suggesting input text based on tone mark information for Chinese or Japanese characters or words.

FIG. 3A shows the text suggestion apparatus 300 after receiving a first input character (i.e., the Chinese character "的") and associated tone mark (collectively 312). The text suggestion apparatus 300 identifies the character and the tone mark and proposes a first phrase 306 and a second phrase 308 based on the first character and the tone mark. As depicted, the first character 312 includes a tone mark corresponding to the first tone (i.e., a macron or "¯"). The first phrase 306 and the second phrase 308 include homonyms of the character 312 that correspond to the first tone.

Figure 3B:
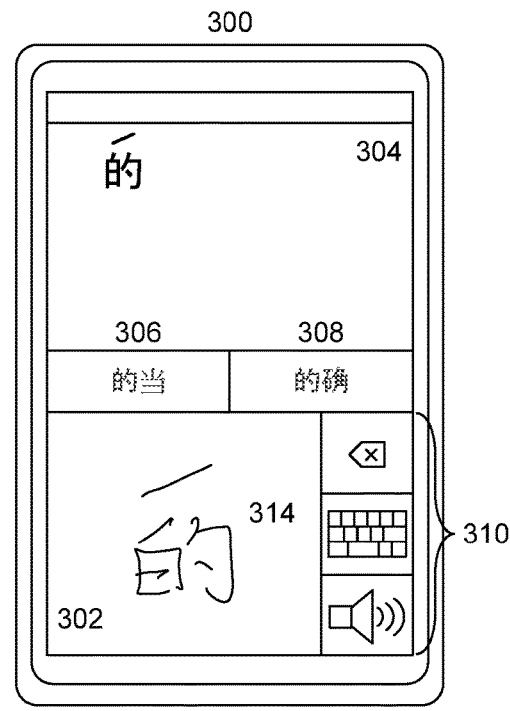
FIG. 3B is a diagram illustrating another embodiment of an apparatus for suggesting input text based on tone mark information for Chinese or Japanese characters or words.

FIG. 3B shows the text suggestion apparatus 300 after receiving a second input character (i.e., the Chinese character "的") and associated tone mark (collectively 314). The text suggestion apparatus 300 identifies the character and the tone mark and proposes a first phrase 306 and a second phrase 308 based on the second character and the tone mark. As depicted, the second character 314 includes a tone mark corresponding to the second tone (i.e., an acute accent or "´"). The first phrase 306 and the second phrase 308 include homonyms of the character 314 that correspond to the second tone.

Figure 3C:
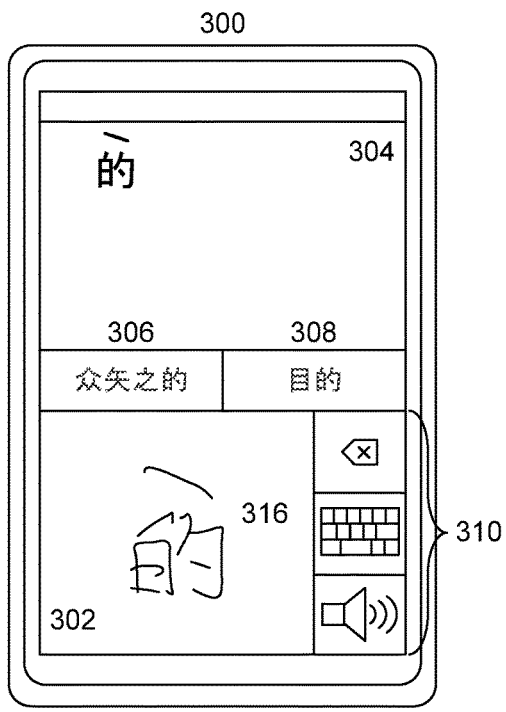
FIG. 3C is a diagram illustrating another embodiment of an apparatus for suggesting input text based on tone mark information for Chinese or Japanese characters or words.

FIG. 3C shows the text suggestion apparatus 300 after receiving a third input character (i.e., the Chinese character "的") and associated tone mark (collectively 316). The text suggestion apparatus 300 identifies the character and the tone mark and proposes a first phrase 306 and a second phrase 308 based on the third character and the tone mark. As depicted, the third character 316 includes a tone mark corresponding to the fourth tone (i.e., a grave accent or "`"). The first phrase 306 and the second phrase 308 include homonyms of the character 316 that correspond to the fourth tone.

Figure 3D:
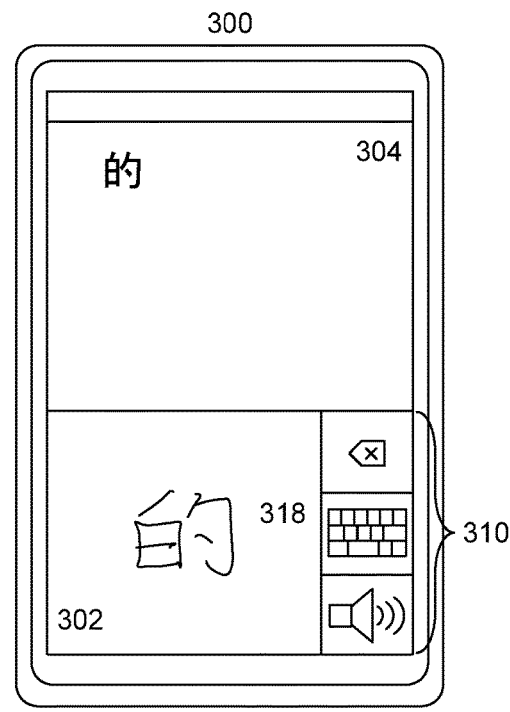
FIG. 3D is a diagram illustrating another embodiment of an apparatus for suggesting input text based on tone mark information for Chinese or Japanese characters or words.

FIG. 3D shows the text suggestion apparatus 300 after receiving an input character 318 (i.e., the Chinese character "的") without an associated tone mark. The text suggestion apparatus 300 identifies the character but does not propose a first phrase 306 or a second phrase 308 as there is no tone mark associated with the character 318. As depicted, the text representation of the character 318 displayed in the received text region 304 also lacks a tone mark.

Figure 4A:
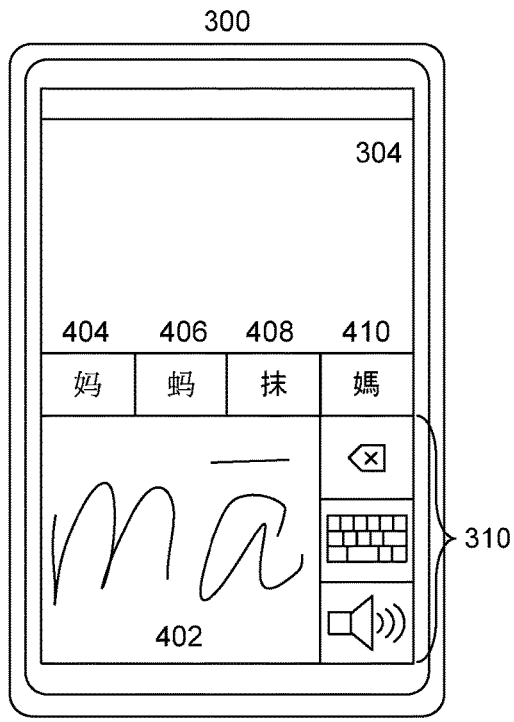
FIG. 4A is a diagram illustrating another embodiment of an apparatus for suggesting input text based on tone mark information for Chinese or Japanese characters or words.

FIG. 4A-4D depict the apparatus 300, according to embodiments of the disclosure. FIG. 4A shows the text suggestion apparatus 300 after receiving an input Pinyin word (e.g., via the text module 202) and identifying an associated tone mark (e.g., via the tone mark module 204). Here, the Pinyin word "ma" and associated macron tone mark (collectively 402) are shown in the input region 302. The macron tone mark indicates the first tone, and the text suggestion apparatus 300 identifies a plurality of Chinese characters corresponding to the Pinyin word "ma" that use the first tone (e.g., via the character module 220). As shown, the text suggestion apparatus 300 proposes a first character 404 ("妈"), a second character 406 ("蚂"), a third character 408 ("抹"), and a fourth character 410 ("媽"). The characters 404-410 are selected from homophones of the Pinyin word "ma" and the first tone mark 402. In some embodiments, the characters 404-410 are the four most likely characters corresponding to the input Pinyin word and tone mark 402. Beneficially, using tone marks significantly reduces the number of possible characters corresponding to the Pinyin input, thus improving input speed and throughput.

Figure 4B:
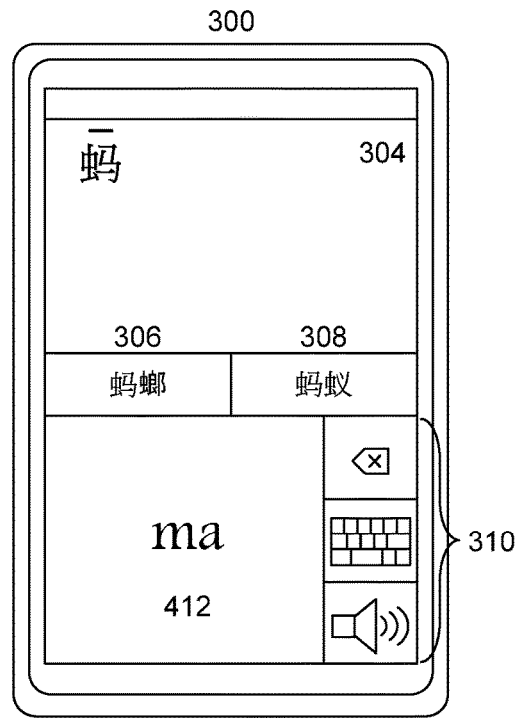
FIG. 4B is a diagram illustrating another embodiment of an apparatus for suggesting input text based on tone mark information for Chinese or Japanese characters or words.

FIG. 4B shows the text suggestion apparatus 300 after the user has selected the second character 406 ("蚂"). Responsive to the user selection of the second character 406 ("蚂"), the text suggestion apparatus 300 proposes a first phrase 306 ("蚂螂") and a second phrase 308 ("蚂蚁") based on the selected homophone and the input tone mark (e.g., via the suggestion module 206). The proposed phrases may be the two most likely phrases based on the input Pinyin word and tone mark 402. In some embodiments, the text suggestion apparatus 300 replaces, at the input region 302, the handwritten Pinyin word 402 with a text representation 411 of the Pinyin word. Beneficially, using tone marks significantly reduces the number of possible phrases including the Pinyin input, thus improving input speed and throughput.

Figure 4C:
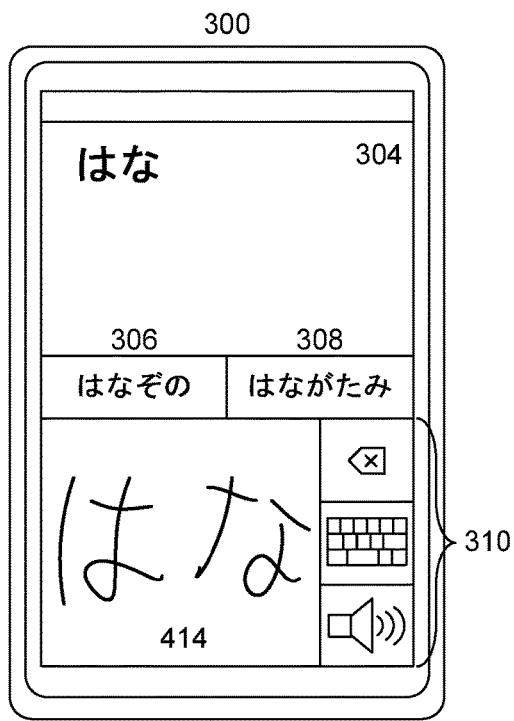
FIG. 4C is a diagram illustrating another embodiment of an apparatus for suggesting input text based on tone mark information for Chinese or Japanese characters or words.

FIG. 4C shows the text suggestion apparatus 300 after receiving input characters 414 (i.e., the Japanese characters "はな"). The text suggestion apparatus 300 identifies the characters and proposes a first phrase 306 and a second phrase 308 based on the identified characters. In some embodiments, the text suggestion apparatus 300 also receives one or more tone marks associated with the input characters 414 and proposes phrases based on the tone marks. As depicted, the received text region 304 displays a text representation of the handwritten characters 414.

Figure 4D:
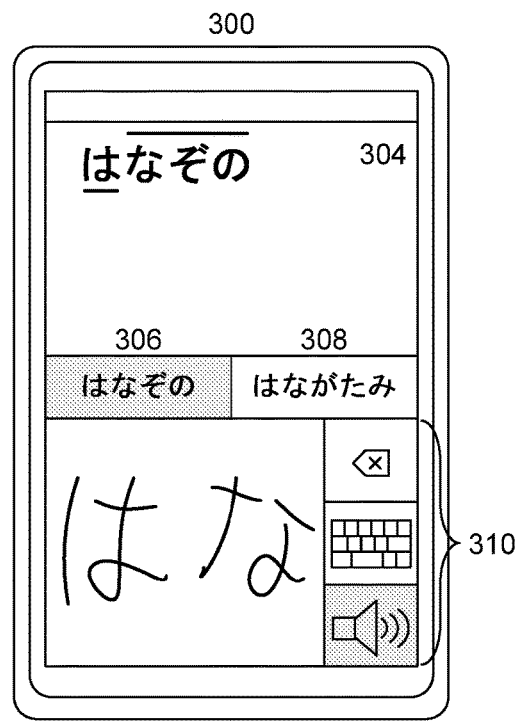
FIG. 4D is a diagram illustrating another embodiment of an apparatus for suggesting input text based on tone mark information for Chinese or Japanese characters or words.

FIG. 4D shows the text suggestion apparatus 300 after receiving a user selection of the first phrase 306 and after enabling a pronunciation guide responsive to user commands via the controls 310. As depicted, a text representation of the selected first phrase 306 is displayed in the received text region 304. Additionally, tone marks are displayed in the received text region 304 adjacent to the first phrase 306. The pronunciation guide and displayed tone marks aid a Japanese student to correctly pronounce the first phrase 306.

Figure 5:
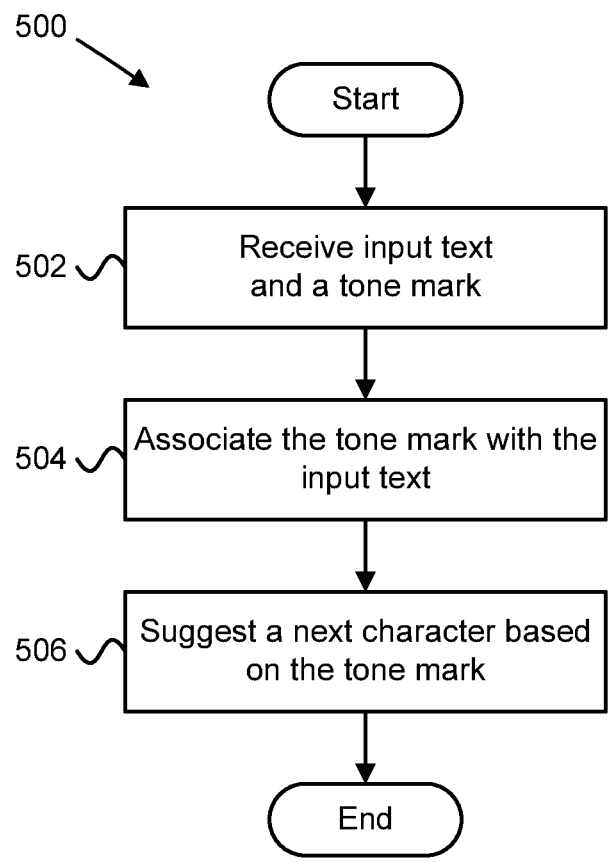
FIG. 5 is a schematic flow chart diagram illustrating one embodiment of a method for suggesting input text based on tone mark information for Chinese or Japanese characters or words.

FIG. 5 depicts a method 500 for suggesting input text based on tone mark information for Chinese or Japanese characters or words, according to embodiments of the disclosure. In some embodiments, the method 500 is performed using a tone mark based suggestion device, such as the tone mark analysis module 106, the tone mark analysis module 200, and/or the text suggestion apparatus 300 described above with reference to FIGS. 1-2, 3A-3D, and 4A-4D. In some embodiments, the method 500 is performed by a processor, such as a microcontroller, a microprocessor, a central processing unit (CPU), a graphics processing unit (GPU), an auxiliary processing unit, a FPGA, or the like.

The method 500 begins with the tone mark based suggestion device receiving 502 input text and a tone mark. In some embodiments, the input text is received 502 using a text input module (e.g., the text input module 202). In certain embodiments, the input text is received 502 directly from an input device (e.g., the input device 104). In certain embodiments, the input text is received 502 from a processor (e.g., the processor 102). In further embodiments, the input text may be received 502 from a networked device via the processor 102. Similarly, the tone mark may be received 502 from a tone mark module, such as the tone mark module 204, from an input device (such as the input device 104), and/or from a processor (such as the processor 102).

In some embodiments, receiving 502 the input text and the tone mark includes receiving typed input text and a handwritten tone mark. For example, a user may input the text using a keyboard (physical or virtual) and input the tone mark using a digital pen, or other handwriting input device. In other embodiments, the input text and the tone mark are both input via the same mechanism (e.g., a handwriting input device).

The tone mark based suggestion device then associates 504 the tone mark with the input text. In some embodiments, tone mark is a handwritten symbol associated with the typed or handwritten input text. In other embodiments, the tone mark may be a typed or handwritten numeral appended to the input text. In yet other embodiments, the tone mark may be a gesture associated with the input text. When associating 504 the tone mark with the input text, a specific tone may be identified, according to some embodiments.

In certain embodiments, the tone mark is associated 504 using a tone mark module, such as tone mark module 204. In some embodiments, where the input text comprises a plurality of characters or words, associating 504 the tone mark with the input text includes determining which character or word is associated with a particular tone mark. In certain embodiments, the determination may be based on distance between a character or word and the particular tone mark and/or the input order of the input text and the particular tone mark.

The tone mark based suggestion device then suggests 506 at least one character based on the received tone mark. In certain embodiments, the suggested characters are part of a phrase that includes the input text. Characters may be selected from a list of characters that commonly follow the particular input text, the list of characters being filtered based on the tone mark to eliminate characters. The suggested characters may be based on user statistics including recently used characters or phrases and commonly used characters or phrases.

In some embodiments, suggesting 506 at least one character may include suggesting 506 one or more homonyms of the input text and tone mark. For example, the tone mark based suggestion device may identify (e.g., recognize) characters or words of the input text, compile a list of homonyms based on the identified characters (or words) and the tone mark. In certain embodiments, suggesting 506 at least one character may include suggesting 506 a correction to the inputted character and/or tone mark.

Suggesting 506 at least one character may include calculating a probability that a particular character will follow the input text. The probability may be based on language statistics stored in memory. In certain embodiments, the language statistics are adjusted based on user statistics stored in memory. In some embodiments, the tone mark based suggestion device only suggests characters whose probability is above a predefined threshold. The method 500 ends.

Figure 6:
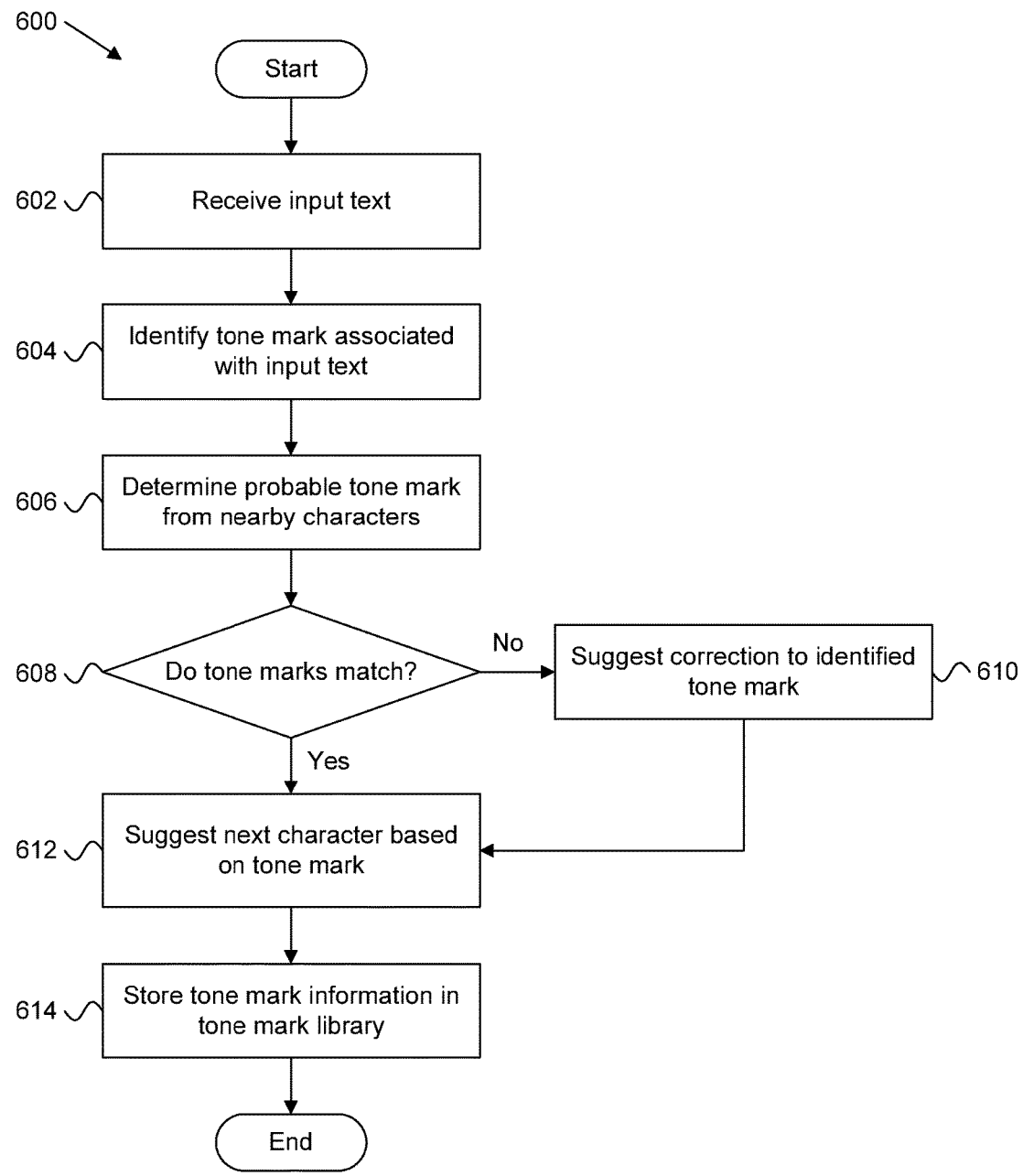
FIG. 6 is a schematic flow chart diagram illustrating another embodiment of a method for suggesting input text based on tone mark information for Chinese or Japanese characters or words.

FIG. 6 depicts a method 600 for suggesting input text based on tone mark information for Chinese or Japanese characters or words, according to embodiments of the disclosure. In some embodiments, the method 600 is performed using a tone mark based suggestion device, such as the tone mark analysis module 106, the tone mark analysis module 200, and/or the text suggestion apparatus 300 described above with reference to FIGS. 1-2, 3A-3D, and 4A-4D. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins and the tone mark based suggestion device receives 602 input text. In some embodiments, the input text is received 602 using a text input module (e.g., the text input module 202). In certain embodiments, the input text is received 602 directly from an input device (e.g., the input device 104). In certain embodiments, the input text is received 602 from a processor (e.g., the processor 102). In further embodiments, the input text may be received 602 from a networked device via the processor 102.

In some embodiments, receiving 602 the input text includes receiving typed input text. For example, a user may input the text using a keyboard (physical or virtual). In other embodiments, receiving 602 the input text includes receiving handwritten input text. For example, a user may input the text using a digital pen, a touch panel, or other handwriting input device.

The tone mark based suggestion device then identifies 604 a tone mark associated with the input text. In some embodiments, identifying 604 the tone mark includes determining which character or word is associated with a particular tone mark. The tone mark may be received from an input device, such as the input device 104, and/or from a processor, such as the processor 102. In some embodiments, tone mark is a handwritten symbol associated with typed or handwritten input text. In other embodiments, the tone mark may be a typed or handwritten numeral appended to the input text. In yet other embodiments, the tone mark may be a gesture associated with the input text.

Identifying 604 the tone mark includes determining that the input tone mark matches a particular tone mark among the tone marks of the input language. For example, in Mandarin Chinese there are four tones (plus a neutral tone) used to distinguish homophones characters or words (i.e., characters or words with the same sound). As another example, in Japanese there are typically two tones (also known as pitch accents) used to distinguish words.

The tone mark based suggestion device then determines 606 at least one probable tone mark for the input text based on nearby characters (or words), including the character (or word) associated with the identified tone mark. In some embodiments, The tone mark based suggestion device then determines 608 whether the identified tone mark matches at least one probable tone marks. In some embodiments, the tone mark based suggestion device compares the identified tone to the each probable tone mark. If there is no match, then the tone mark based suggestion device suggests 610 a correction to the identified tone mark based on the identified tone mark. Otherwise, if there is a match, the tone mark based suggestion device suggests 612 one or more next characters based on the tone mark and associated character of the input text.

Suggesting 610 a correction to the identified tone mark may include displaying the list of tone marks comprising the identified tone mark and each probable tone mark. Additionally, the user may be prompted to select a tone mark from the list. Displaying the list may include displaying the character or word associated with the tone mark. For example, if two probable tone marks are determined, neither matching the identified tone mark, the user may be presented a list of three versions of a character associated with the identified tone mark and prompted to select a version, each version showing one of the identified or probable tone marks. If the user selects one of the probable tone marks, then the selected tone mark is associated with the input text replacing the identified tone mark. In response to suggesting 610 a correction to the identified tone mark, the tone mark based suggestion device may suggest 612 one or more next characters based on the tone mark and associated character of the input text.

Suggesting 612 one or more next characters based on the tone mark and associated character of the input text may include suggesting 612 characters that are part of a phrase that includes the input text. Characters may be selected from a list of characters that commonly follow the particular input text, the list of characters being filtered based on the tone mark to eliminate characters. The suggested 612 characters may be based on user statistics including recently used characters or phrases and commonly used characters or phrases.

In some embodiments, suggesting 612 one or more next characters may include suggesting 612 one or more homonyms of the input text and tone mark. For example, the tone mark based suggestion device may identify (e.g., recognize) characters or words of the input text, compile a list of homonyms based on the identified characters (or words) and the tone mark. In certain embodiments, suggesting 612 one or more next characters may include suggesting 612 a correction to the inputted character and/or tone mark.

Suggesting 612 one or more next characters may include calculating a probability that a particular character will follow the input text. The probability may be based on language statistics stored in memory. In certain embodiments, the language statistics are adjusted based on user statistics stored in memory. In some embodiments, the tone mark based suggestion device may suggest only characters whose probability is above a predefined threshold.

The tone mark based suggestion device then stores 614 tone mark information in a tone library. The tone mark information may include the identified tone mark, a character associated with the tone mark, a likelihood that the identified tone mark is correct, and/or adjacent characters or tone marks. In some embodiments, the tone library is updated each time a new tone mark is associated 604 with an identified character of the input text. The tone library may be stored in a computer storage medium, such as the memory 110. The method 600 ends.

Figure 7:
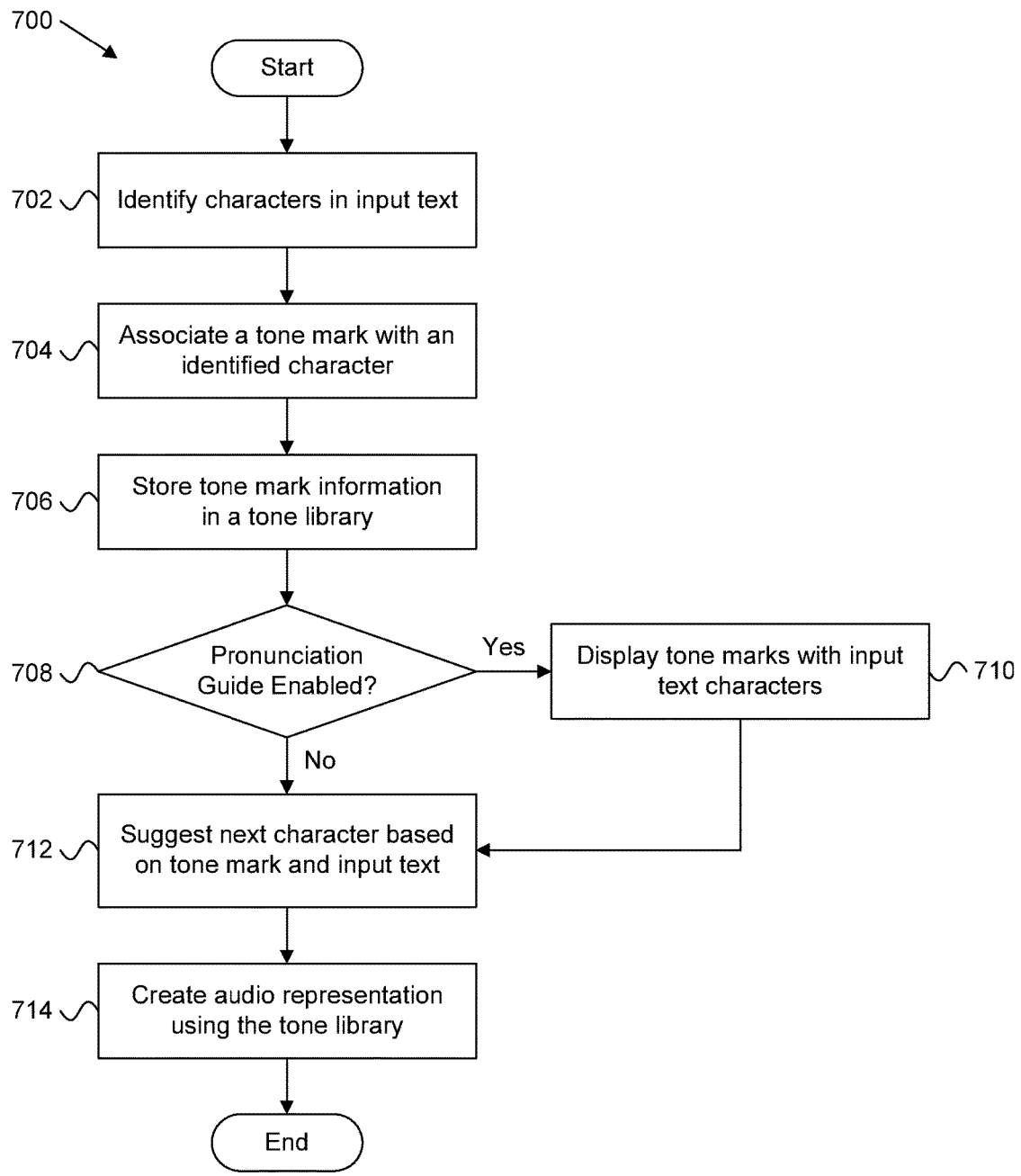
FIG. 7 is a schematic flow chart diagram illustrating another embodiment of a method for suggesting input text based on tone mark information for Chinese or Japanese characters or words.

FIG. 7 depicts a method 700 for suggesting input text based on tone mark information for Chinese or Japanese characters or words, according to embodiments of the disclosure. In some embodiments, the method 700 is performed using a tone mark based suggestion device, such as the tone mark analysis module 106, the tone mark analysis module 200, and/or the text suggestion apparatus 300 described above with reference to FIGS. 1-2, 3A-3D, and 4A-4D. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins and the tone mark based suggestion device identifies 702 characters of input text. The input text may include handwritten text input and/or typed text and may be inputted using a keyboard (physical or virtual), a digital pen, a touch panel, or other handwriting input device. In certain embodiments, the input text is received directly from an input device, such as input device 104. In certain embodiments, the input text is received from a processor, such as processor 102. In further embodiments, the input text may be received from a networked device via the processor 102. The input text may comprise of one or more of handwritten text and typed text.

Identifying 702 characters of the text may include parsing the input text to identify characters within the input text. A text recognition engine may be used to compare the parsed characters with a library of valid input characters to identify characters of the input text. In some embodiments, identifying 702 characters includes analyzing handwritten input text to identify characters. For example, optical character recognition may be used to identify 702 the characters. As another example, handwriting strokes may be analyzed to identify 702 the characters. In further embodiments, a print character corresponding to the identified 702 characters may be displayed.

The tone mark based suggestion device then associates 704 a tone mark with one of the identified character. In some embodiments, tone mark is a handwritten symbol associated with the typed or handwritten input text. In other embodiments, the tone mark may be a typed or handwritten numeral appended to the input text. In yet other embodiments, the tone mark may be a gesture associated with the input text. When associating 704 the tone mark with the input text, a specific tone may be identified, according to some embodiments.

In certain embodiments, the tone mark is associated 704 using a tone mark module, such as tone mark module 204. In some embodiments, where the input text comprises a plurality of characters or words, associating 704 the tone mark with the input text includes determining which character or word is associated with a particular tone mark. In certain embodiments, the determination may be based on distance between a character or word and the particular tone mark and/or the input order of the input text and the particular tone mark.

The tone mark based suggestion device may then store 706 tone mark information in a tone library. The tone library may be stored in a computer storage medium, such as the memory 110. In some embodiments, the tone library is updated each time a new tone mark is associated 704 with an identified character of the input text. Storing 706 tone mark information may include storing a tone mark identity (for example, a specific one of the five possible tone in Mandarin Chinese), a word (or character) associated with the tone mark, and/or a likelihood that the input tone mark is correct.

Next, the tone mark based suggestion device determines 708 whether a pronunciation guide has been enabled by the user. If pronunciation guide is enabled, then the tone mark based suggestion device displays 710 all tone marks associated with the input text characters. Otherwise, if pronunciation guide is not enabled, the tone mark based suggestion device suggests 712 one or more next characters based on the tone mark and associated character of the input text.

Displaying 710 the tone marks associated with the input text characters includes displaying the tone marks in proximity to corresponding characters of the input text. Displaying 710 may also include retrieving tone mark information from a tone library. For example, the tone mark based suggestion device may reference the tone library to identify a tone mark corresponding to each input text character. In some embodiments, displaying 710 the tone marks includes displaying the tone marks in a different color that the characters. In response to displaying 710 the tone marks, the tone mark based suggestion device suggests 712 one or more next characters based on the tone mark and associated character of the input text.

Suggesting 712 one or more next characters based on the tone mark and associated character of the input text may include suggesting 712 characters that are part of a phrase that includes the input text. Characters may be selected from a list of characters that commonly follow the particular input text, the list of characters being filtered based on the tone mark to eliminate characters. The suggested 712 characters may be based on user statistics including recently used characters or phrases and commonly used characters or phrases.

In some embodiments, suggesting 712 one or more next characters may include suggesting 712 one or more homonyms of the input text and tone mark. For example, the tone mark based suggestion device may identify (e.g., recognize) characters or words of the input text, compile a list of homonyms based on the identified characters (or words) and the tone mark. In certain embodiments, suggesting 712 one or more next characters may include suggesting 712 a correction to the inputted character and/or tone mark.

Suggesting 712 one or more next characters may include calculating a probability that a particular character will follow the input text. The probability may be based on language statistics stored in memory. In certain embodiments, the language statistics are adjusted based on user statistics stored in memory. In some embodiments, the tone mark based suggestion device may suggest only characters whose probability is above a predefined threshold.

The tone mark based suggestion device may then create 714 an audio representation of the input text based on the tone library. The audio representation may include a computer synthesized voice and/or pre-recorded voice samples. Creating 714 an audio representation may include obtaining tone mark information from the tone library and synthesizing or selecting an appropriate tone for the input text based on the tone mark information. The method ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a handwriting input unit operatively coupled to the processor;
   a display device operatively coupled to the processor; and
   a memory that stores code executable by the processor to:
   receive an input from a user via the handwriting input unit, the input corresponding to a single handwritten character being a Chinese character and not a pinyin word;
   recognize the single handwritten character from the input;
   identify a set of homonym characters for the single handwritten character, the set of homonym characters comprising the single handwritten character and at least one additional Chinese character having a same shape as the single handwritten character;
   receive, via the handwriting input unit, a user input tone mark for the single handwritten character;
   select a homonym character from the set of homonym characters using the user input tone mark; and
   propose, to the user via the display device, at least one next character in a phrase including the selected homonym character, the at least one next character being adjacent to the selected homonym character in the phrase, each character of the at least one next character being a Chinese character logogram, wherein the at least one next character is selected based on the homonym character selected using the tone mark.

2. The apparatus of claim 1, wherein the memory further comprises code executable by the processor to:
   determine a probable tone mark for the input text based on nearby characters and compares the probable tone mark to the identified tone mark, and propose, via the display device, a correction to the identified tone mark in response to the identified tone mark not matching the probable tone mark.

3. The apparatus of claim 1, wherein the processor further selects the next character based on an additional handwritten character near the handwritten character.

4. The apparatus of claim 1, wherein the memory further comprises code executable by the processor to:
prompt a user to enable a pronunciation guide; and
display a tone mark in proximity to characters of the input text in response to the user enabling the pronunciation guide.

5. The apparatus of claim 1, wherein the memory further comprises code executable by the processor to store tone mark information in a tone library, the tone mark information based on the identified tone mark.

6. The apparatus of claim 5, wherein the memory further comprises code executable by the processor to create an audio representation of input words based on the tone library.

7. The apparatus of claim 5, wherein the memory further comprises code executable by the processor to:
display tone marks on the input text based on the tone library; and
display the input text without the tone mark in response to the user selecting a next character.

8. The apparatus of claim 1, wherein the memory further comprises code executable by the processor to: display the identified tone mark in proximity to the input text;
determine whether a sentence has been completed; and
remove the tone mark from the input text in response to the sentence being completed.

9. The apparatus of claim 1, wherein the memory further comprises code executable by the processor to receive a user selection of the at least one next character.

10. A method comprising:
receiving, by use of a processor, an input from a user via the handwriting input unit, the input corresponding to a single handwritten character being a Chinese character and not a pinyin word;
recognizing the single handwritten character from the input;
identifying a set of homonym characters for the single handwritten character, the set of homonym characters comprising the single handwritten character and at least one additional character having a same shape as the single handwritten character;
receiving, from the user, a tone mark for the single handwritten character;
selecting a homonym character from the set of homonym characters using the user input tone mark; and
suggesting, to the user via a display device, a next character in a phrase including the selected homonym character, the next character being adjacent to the selected homonym character in the phrase, the next character being a Chinese logogram, wherein the next character is selected based on the homonym character selected using the tone mark.

11. The method of claim 10, further comprising:
determining a probable tone mark for the input text based on nearby characters;
comparing the probable tone mark to the identified tone mark; and
suggesting a correction to the identified tone mark in response to the identified tone mark not matching the probable tone mark.

12. The method of claim 10, wherein the next character is further selected based on a context of the handwritten character.

13. The method of claim 10, further comprising:
prompting a user to enable a pronunciation guide; and
displaying a tone mark in proximity to characters of the input text in response to the user enabling the pronunciation guide.

14. The method of claim 10, further comprising storing tone mark information in a tone library, the tone mark information based on the identified tone mark.

15. The method of claim 14, further comprising:
displaying tone marks on the input text based on the tone library; and
displaying the input text without the tone mark in response to the user selecting a next character.

16. The method of claim 14, further comprising creating an audio representation of input words based on the tone library.

17. The method of claim 10, further comprising:
displaying the identified tone mark in proximity to the input text;
determining whether a sentence has been completed; and
removing the tone mark from the input text in response to the sentence being completed.

18. A program product comprising a non-transitory computer readable storage medium that stores code executable by a processor to perform:
receiving an input character from a user via a handwriting input unit, the input character being a single handwritten Chinese character and not a pinyin word;
identifying a set of homonym characters for the single handwritten Chinese character, the set of homonym characters comprising the single handwritten Chinese character and at least one additional character having a same shape as the single handwritten Chinese character;
receiving, from the user via the handwriting input unit, a tone mark for the single handwritten Chinese character;
selecting a homonym character from the set of homonym characters using the user input tone mark; and
suggesting a phrase hint to the user via a display device, the phrase hint containing a next character in a phrase including the selected homonym character, the next character being adjacent to the selected homonym character in the phrase, each character in the phrase hint being one of: a traditional Chinese character and a simplified Chinese character, wherein the phrase hint is selected based on the homonym character selected using the tone mark.

19. The program product of claim 18, wherein the next character is further selected based on a context of the single handwritten Chinese character.

* * * * *